United States Patent
Ma et al.

(10) Patent No.: US 11,902,841 B2
(45) Date of Patent: Feb. 13, 2024

(54) SYSTEM INFORMATION DESIGN FOR NEIGHBORING CELLS IN A NON-TERRESTRIAL NETWORK

(71) Applicant: QUALCOMM Incorporated, San Diego, CA (US)

(72) Inventors: Liangping Ma, San Diego, CA (US); Huilin Xu, Temecula, CA (US); Jun Ma, San Diego, CA (US); Qiang Wu, San Diego, CA (US); Xiao Feng Wang, San Diego, CA (US); Iyab Issam Sakhnini, San Diego, CA (US); Dan Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/644,902

(22) Filed: Dec. 17, 2021

(65) Prior Publication Data

US 2022/0110030 A1 Apr. 7, 2022

Related U.S. Application Data

(63) Continuation of application No. 17/248,260, filed on Jan. 15, 2021, now Pat. No. 11,228,953.

(60) Provisional application No. 62/976,073, filed on Feb. 13, 2020.

(51) Int. Cl.
*H04W 36/00* (2009.01)

(52) U.S. Cl.
CPC .............. *H04W 36/0061* (2013.01)

(58) Field of Classification Search
CPC ..... H04B 7/18513; H04B 2201/70702; H04W 36/14; H04W 40/246; H04W 36/0061; H04H 20/72; H04H 20/74
See application file for complete search history.

(56) References Cited

U.S. PATENT DOCUMENTS

| | | | |
|---|---|---|---|
| 5,574,968 A * | 11/1996 | Olds | H04B 7/18541 |
| | | | 455/436 |
| 6,111,541 A * | 8/2000 | Karmel | G01S 19/48 |
| | | | 342/357.44 |
| 9,681,337 B2 | 6/2017 | Davis et al. | |
| 10,512,018 B2 | 12/2019 | Benammar et al. | |
| 11,032,751 B2 | 6/2021 | Arur et al. | |
| 11,228,953 B2 * | 1/2022 | Ma | H04W 48/12 |
| 2005/0043046 A1 | 2/2005 | Lee | |

(Continued)

OTHER PUBLICATIONS

International Search Report and Written Opinion—PCT/US2021/070053—ISA/EPO—dated Apr. 30, 2021.

(Continued)

*Primary Examiner* — Dung Hong
(74) *Attorney, Agent, or Firm* — Harrity & Harrity, LLP

(57) ABSTRACT

Various aspects of the present disclosure generally relate to wireless communication. In some aspects, a user equipment (UE) may receive system information associated with a set of neighboring cells included in a non-terrestrial network (NTN). The UE may be connected to or camped in a current cell included in the NTN. The current cell may be associated with a current platform. The UE may monitor a neighboring cell, of the set of neighboring cells, based at least in part on the system information. Numerous other aspects are provided.

20 Claims, 6 Drawing Sheets

(56) References Cited

U.S. PATENT DOCUMENTS

| | | | |
|---|---|---|---|
| 2013/0053035 A1* | 2/2013 | Johansson | H04W 48/16 |
| | | | 455/436 |
| 2013/0121229 A1* | 5/2013 | Vare | H04H 20/22 |
| | | | 370/312 |
| 2015/0111579 A1* | 4/2015 | Arunachalam | H04W 36/0085 |
| | | | 455/436 |
| 2018/0287693 A1 | 10/2018 | Naseef | |
| 2019/0245614 A1 | 8/2019 | Lucky et al. | |
| 2020/0178135 A1* | 6/2020 | Yun | H04W 36/0061 |
| 2021/0006328 A1 | 1/2021 | Kim | |
| 2021/0105693 A1 | 4/2021 | Tripathi et al. | |
| 2021/0258838 A1 | 8/2021 | Ma et al. | |

OTHER PUBLICATIONS

LG Electronics Inc: "Report on Email Discussion [107#64] [NTN] Cell Selection & Reselection", 3GPP TSG-RAN WG2Meeting #107bis, 3GPP Draft; R2-1914070, Report of Email Discussion [107#64][NTN] Cell & Reselection, 3rd Generation Partnership Project (3GPP), Mobile Competence Centre; 650, Route Des Lucioles, F-06921 SOPH, vol. RAN WG2, No. Chongqing, China; Oct. 14, 2019-Oct. 18, 2019, Oct. 18, 2019 (Oct. 18, 2019), 22 Pages, XP051797900, Retrieved from the Internet: URL: https://ftp.3gpp.org/tsg_ran/WG2_RL2/TSGR2_107bis/Docs/R2-1914070.zip R2-1914070 Report of email discussion [107#64] [NTN] Cell selection&reselection.doc [retrieved on Oct. 18, 2019] ZTE Contribution, "Approach 2"; p. 17, p. 4-p. 14.

\* cited by examiner

SYSTEM INFORMATION DESIGN FOR NEIGHBORING CELLS IN A NON-TERRESTRIAL NETWORK

CROSS-REFERENCE TO RELATED APPLICATION

This application is a continuation of U.S. patent application Ser. No. 17/248,260, filed Jan. 15, 2021, entitled "SYSTEM INFORMATION DESIGN FOR NEIGHBORING CELLS IN A NON-TERRESTRIAL NETWORK," which claims priority to U.S. Provisional Patent Application No. 62/976,073, filed on Feb. 13, 2020, entitled "SYSTEM INFORMATION DESIGN FOR NEIGHBORING CELLS IN A NON-TERRESTRIAL NETWORK," the contents of which are incorporated herein by reference in their entireties.

FIELD OF THE DISCLOSURE

Aspects of the present disclosure generally relate to wireless communication and to techniques and apparatuses for communication of system information for neighboring cells in a non-terrestrial network (NTN).

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A UE may communicate with a BS via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method of wireless communication, performed by a UE, may include receiving system information associated with a set of neighboring cells included in an NTN, wherein the UE is connected to or camped in a current cell included in the NTN, the current cell being associated with a current platform; and monitoring a neighboring cell, of the set of neighboring cells, based at least in part on the system information.

In some aspects, a method of wireless communication, performed by a base station, may include determining system information associated with a set of neighboring cells included in an NTN, wherein a UE is connected to or camped in a current cell included in the NTN, the current cell being associated with a current platform; and transmitting the system information associated with the set of neighboring cells.

In some aspects, a UE for wireless communication may include a memory and one or more processors operatively coupled to the memory. The memory and the one or more processors may be configured to receive system information associated with a set of neighboring cells included in an NTN, wherein the UE is connected to or camped in a current cell included in the NTN, the current cell being associated with a current platform; and monitor a neighboring cell, of the set of neighboring cells, based at least in part on the system information.

In some aspects, a base station for wireless communication may include a memory and one or more processors operatively coupled to the memory. The memory and the one or more processors may be configured to determine system information associated with a set of neighboring cells included in an NTN, wherein a UE is connected to or camped in a current cell included in the NTN, the current cell being associated with a current platform; and transmit the system information associated with the set of neighboring cells.

In some aspects, a non-transitory computer-readable medium may store one or more instructions for wireless communication. The one or more instructions, when executed by one or more processors of a UE, may cause the one or more processors to receive system information associated with a set of neighboring cells included in an NTN, wherein the UE is connected to or camped in a current cell included in the NTN, the current cell being associated with a current platform; and monitor a neighboring cell, of the set of neighboring cells, based at least in part on the system information.

In some aspects, a non-transitory computer-readable medium may store one or more instructions for wireless communication. The one or more instructions, when executed by one or more processors of a base station, may cause the one or more processors to determine system information associated with a set of neighboring cells included in an NTN, wherein a UE is connected to or camped in a current cell included in the NTN, the current cell being associated with a current platform; and transmit the system information associated with the set of neighboring cells.

In some aspects, an apparatus for wireless communication may include means for receiving system information associated with a set of neighboring cells included in an NTN, wherein the apparatus is connected to or camped in a current cell included in the NTN, the current cell being associated with a current platform; and means for monitoring a neighboring cell, of the set of neighboring cells, based at least in part on the system information.

In some aspects, an apparatus for wireless communication may include means for determining system information associated with a set of neighboring cells included in an NTN, wherein a UE is connected to or camped in a current cell included in the NTN, the current cell being associated with a current platform; and means for transmitting the system information associated with the set of neighboring cells.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with 3G and/or 4G wireless technologies, aspects of the present disclosure can be applied in other generation-based communication systems, such as 5G and later, including NR technologies.

Figure 1:
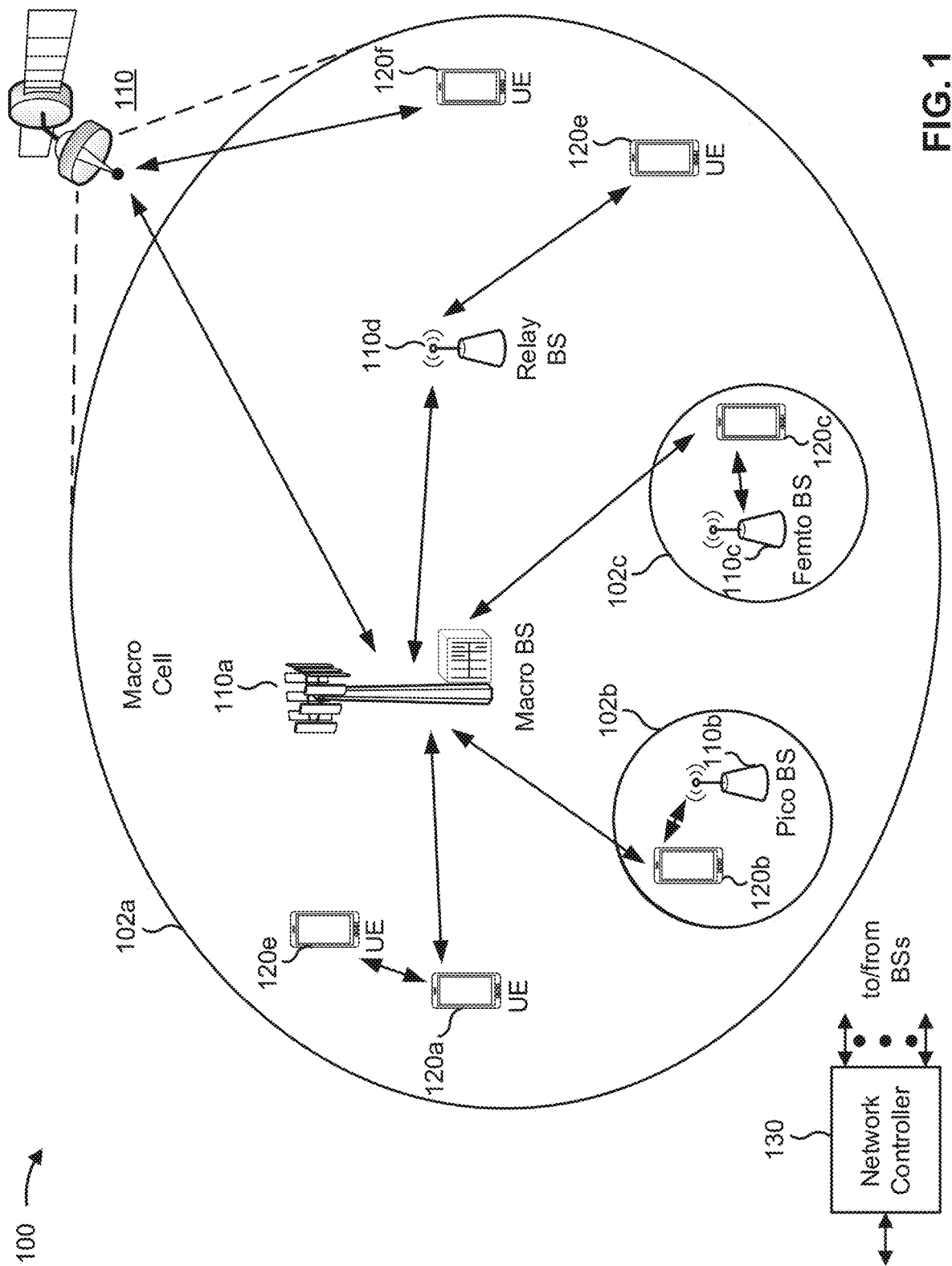
FIG. 1 is a block diagram illustrating an example of a wireless communication network, in accordance with various aspects of the present disclosure.

FIG. 1 is a diagram illustrating a wireless network 100 in which aspects of the present disclosure may be practiced. The wireless network 100 may be an LTE network or some other wireless network, such as a 5G or NR network. The wireless network 100 may include a number of BSs 110 (shown as BS 110a, BS 110b, BS 110c, and BS 110d) and other network entities. A BS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

In some examples, as indicated in FIG. 1, a cell may be provided by a base station 110 of a non-terrestrial network (NTN). Such a base station 110 may also referred to as a non-terrestrial base station 110 or a non-terrestrial access point. As used herein, "NTN" may refer to a network for which access is provided by or assisted by a non-terrestrial base station 110. In some NTN deployments, a non-terrestrial base station 110 may be located on an airborne platform or a platform in orbit. Examples of such platforms include a satellite (e.g., a low earth orbit (LEO) satellite, a medium earth orbit (MEO) satellite, a geostationary orbit (GEO) satellite, or the like), a balloon, a dirigible, an airplane, an unmanned aerial vehicle (UAV), a drone, or the like.

In some NTN deployments (e.g., sometimes referred to as a transparent architecture or a bent pipe architecture), a non-terrestrial base station 110 may act as a relay station to relay communications between a UE 120 and a terrestrial base station 110 (e.g., a base station 110 located on the ground or on a tower). In this case, the non-terrestrial base station 110 may perform, for example, frequency translation and/or radio frequency amplification for communications relayed between the UE 120 and a terrestrial base station 110. For example, the UE 120 may transmit an uplink communication to the non-terrestrial base station 110, which may relay the uplink communication to a terrestrial base station 110 (e.g., after performing frequency translation, radio frequency amplification, and/or the like). The terrestrial base station 110 may perform additional processing on the uplink communication and/or may transmit the uplink communication to a core network. As another example, the terrestrial base station 110 may transmit a downlink communication to the non-terrestrial base station 110, which may relay the downlink communication to the UE 120 (e.g., after performing frequency translation, radio frequency amplification, and/or the like). In some aspects, a UE 120 and/or the terrestrial base station 110 may be referred to as a ground station (GS).

A network controller 130 may couple to a set of BSs and may provide coordination and control for these BSs. Network controller 130 may communicate with the BSs via a backhaul. The BSs may also communicate with one another, directly or indirectly, via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like. In some aspects, the processor components and the memory components may be coupled together. For example, the processor components (e.g., one or more processors) and the memory components (e.g., a memory) may be operatively coupled, communicatively coupled, electronically coupled, electrically coupled, and/or the like.

In general, any number of wireless networks may be deployed in a given geographic area. Each wireless network may support a particular radio access technology (RAT) and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

As indicated above, FIG. 1 is provided as an example. Other examples may differ from what is described with regard to FIG. 1.

Figure 2:
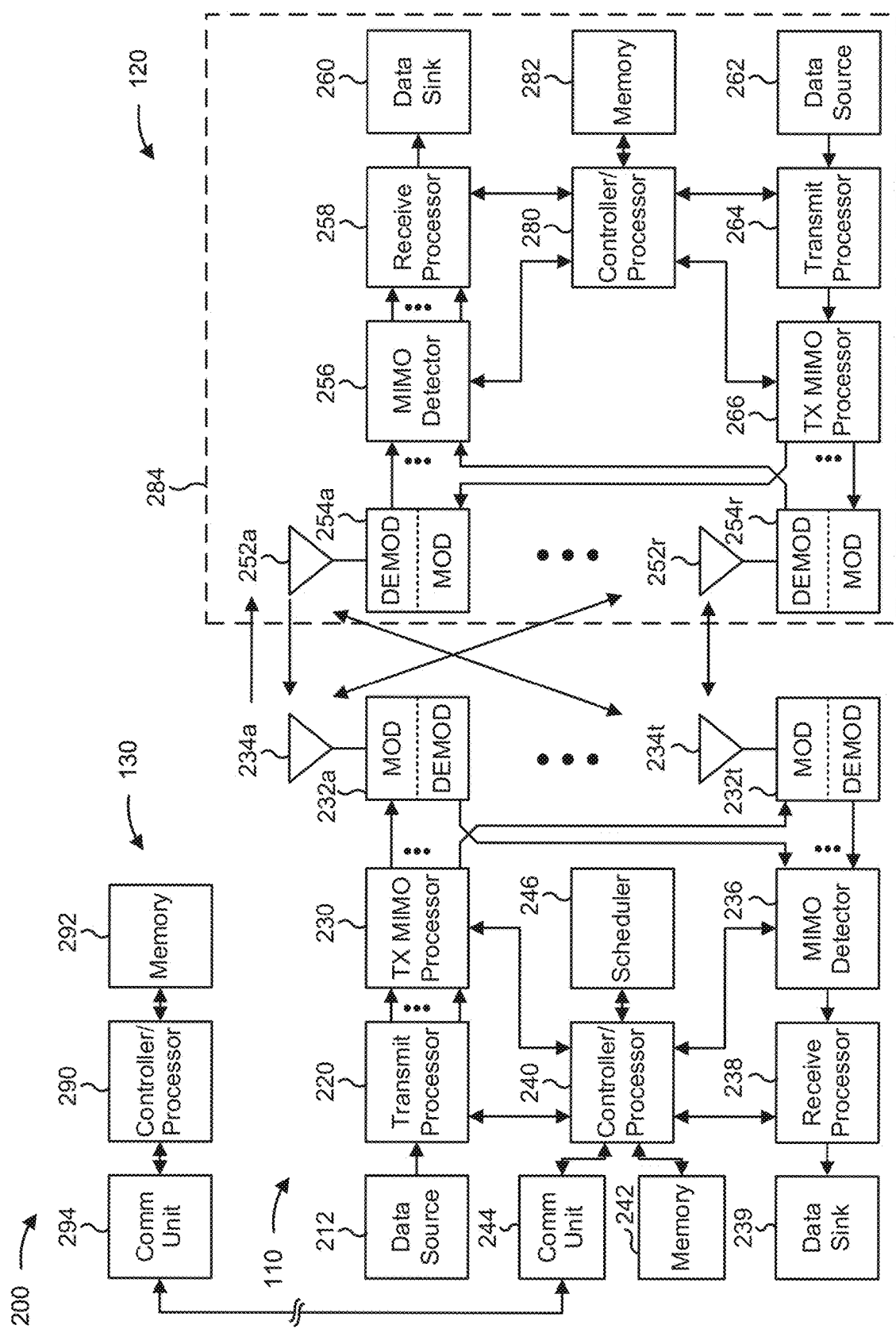
FIG. 2 is a block diagram illustrating an example of a base station in communication with a UE in a wireless communication network, in accordance with various aspects of the present disclosure.

FIG. 2 shows a block diagram of a design 200 of base station 110 and UE 120, which may be one of the base stations and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, and/or any other component(s) of FIG. 2 may perform one or more techniques associated with communication of system information for neighboring cells in an NTN, as described in more detail elsewhere herein. For example, controller/processor 240 of base station 110, controller/processor 280 of UE 120, and/or any other component(s) of FIG. 2 may perform or direct operations of, for example, process 4 of FIG. 4, process 5 of FIG. 5, and/or other processes as described herein. Memories 242 and 282 may store data and program codes for base station 110 and UE 120, respectively. In some aspects, memory 242 and/or memory 282 may comprise a non-transitory computer-readable medium storing one or more instructions for wireless communication. For example, the one or more instructions, when executed (e.g., directly, or after compiling, converting, interpreting, and/or the like) by one or more processors of the base station 110 and/or the UE 120, may perform or direct operations of, for example, process 4 of FIG. 4, process 5 of FIG. 5, and/or other processes as described herein. In some aspects, executing instructions may include running the instructions, converting the instructions, compiling the instructions, interpreting the instructions, and/or the like. A scheduler 246 may schedule UEs for data transmission on the downlink and/or uplink.

In some aspects, UE 120 may include means for receiving system information associated with a set of neighboring cells included in an NTN, wherein UE 120 is connected to or camped in a current cell included in the NTN, the current cell being associated with a current platform; means for monitoring a neighboring cell, of the set of neighboring cells, based at least in part on the system information; and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

In some aspects, base station 110 may include means for determining system information associated with a set of neighboring cells included in an NTN, wherein a UE 120 is connected to or camped in a current cell included in the NTN, the current cell being associated with a current platform; means for transmitting the system information associated with the set of neighboring cells; and/or the like. In some aspects, such means may include one or more components of base station 110 described in connection with FIG. 2, such as antenna 234, DEMOD 232, MIMO detector 236, receive processor 238, controller/processor 240, transmit processor 220, TX MIMO processor 230, MOD 232, antenna 234, and/or the like.

As indicated above, FIG. 2 is provided as an example. Other examples may differ from what is described with regard to FIG. 2.

As described above, an NTN may utilize non-terrestrial base stations (e.g., non-terrestrial base stations 110) located on platforms (sometimes referred to high altitude platforms (HAPs)) as nodes for providing or assisting UEs (e.g., UEs 120) with access to a core network. In an NTN, and similar to a terrestrial cellular network, the NTN system may be deployed in cells. A cell in which a UE is connected to or camped in is referred to as a current cell of the UE. The UE can dynamically switch to a neighboring cell of the current cell in various scenarios. For example, when the current cell is provided by a geostationary platform, such as a GEO satellite, the UE may switch to a neighboring cell due to movement of the UE. As another example, when the current cell is provided by a non-geostationary platform, such as a LEO satellite, the UE may switch to a neighboring cell due to movement of the platform and/or movement of the UE.

In an NTN system, again similar to a terrestrial cellular network, system information should be broadcast in a cell. To facilitate UE mobility (e.g., cell re-selection or handover) within the NTN network, system information should be broadcast for the current cell and neighboring cells of the current cell. However, unlike the terrestrial cellular network, NTN platforms typically have pre-determined locations (e.g., in an orbit) and the UE is equipped with high-gain narrow-beam directional antennas (e.g., a dish). A design of a means for conveying system information in an NTN (e.g., a system information block (SIB)) should take these factors into account.

A design for an NR NTN can be based on an NR system design. A typical SIB in an NR system provides information regarding neighboring frequency carriers and neighboring cells. For example, SIB3 is designed to convey intra-frequency neighboring cell information (e.g., a list of intra-frequency neighboring cells with specific cell re-selection parameters and a list of blacklisted intra-frequency neighboring cells), while SIB4 is designed to convey inter-frequency carrier and neighboring cell information (e.g., a list of neighboring carrier frequencies and frequency specific cell re-selection information, a list of inter-frequency neighboring cells with specific cell re-selection parameters, and a list of blacklisted inter-frequency neighboring cells).

Some aspects described herein provide techniques and apparatuses for communication of system information for neighboring cells in an NTN. Various example techniques for conveying system information for neighboring cells in an NTN are described below.

Figure 3A:
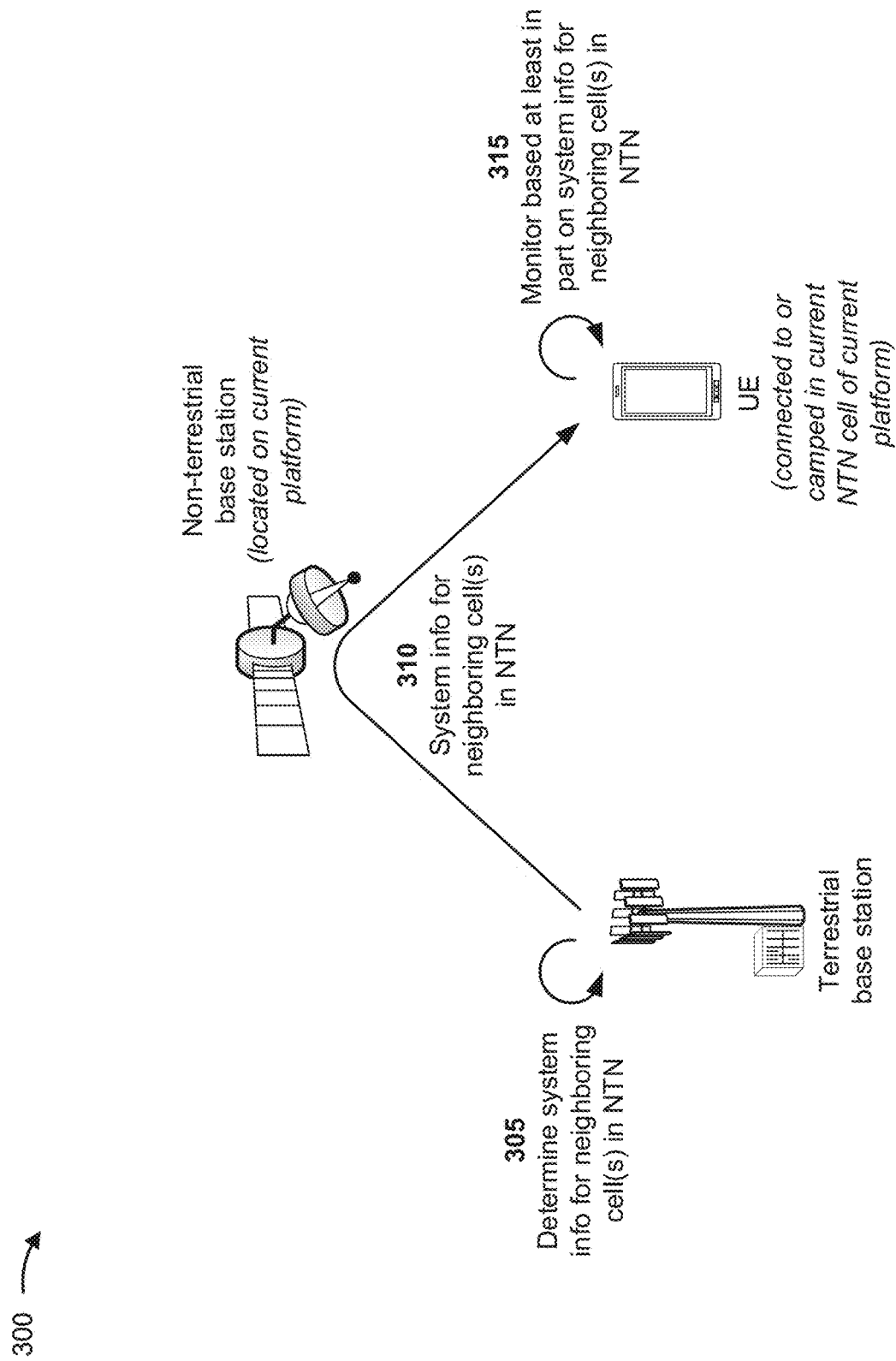
FIGS. 3A and 3B are diagrams illustrating examples associated with communication of system information for neighboring cells in an NTN, in accordance with various aspects of the present disclosure.
Figure 3B:
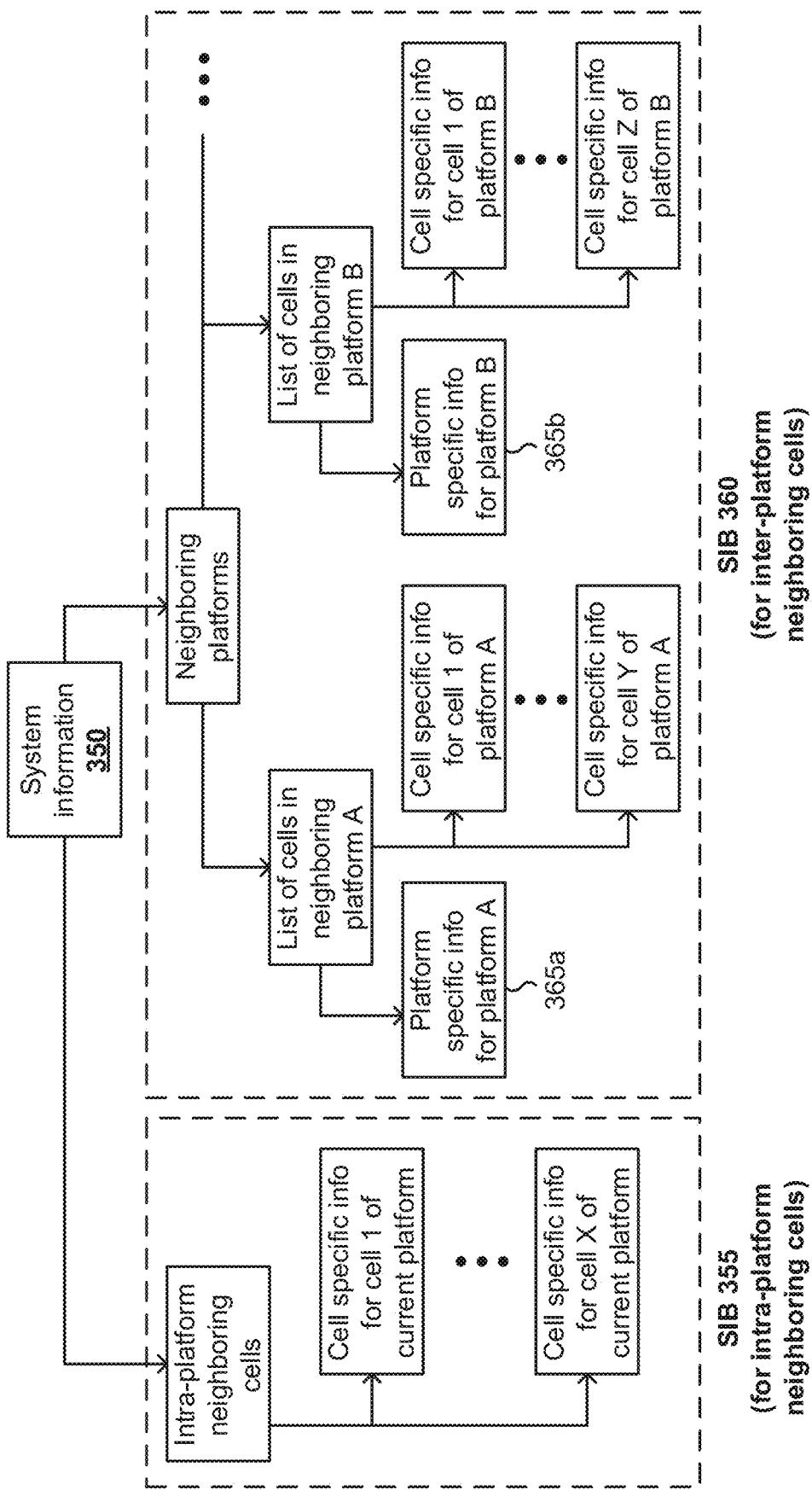

FIGS. 3A and 3B are diagrams illustrating examples associated with comm communication of system information for neighboring cells in an NTN, in accordance with various aspects of the present disclosure.

In the example shown in FIG. 3A, a UE (e.g., a UE 120) is connected to or camped in a cell of an NTN, the cell of the NTN being provided by a non-terrestrial base station (e.g., a non-terrestrial base station 110). Here, the cell in which the UE is connected to or camped in is referred to as a current cell, and the platform that provides the current cell is referred to as a current platform (shown as a satellite in FIG. 3A).

Notably, example FIG. 3A is an example in which the non-terrestrial base station serves as a relay between the UE and a terrestrial base station (e.g., such that the UE 120 is provided access through a terrestrial base station 110). However, in another example, the non-terrestrial base station may provide access to the UE directly, rather than acting as a relay. In such a case, actions described below as being performed by the terrestrial base station would be performed by the non-terrestrial base station.

As shown by reference 305 in FIG. 3A, the terrestrial base station may determine system information associated with a set of neighboring cells included in an NTN. Here, the set of neighboring cells may be a set of cells that neighbor the current cell. In some aspects, the set of neighboring cells may include one or more intra-platform neighboring cells (e.g., one or more neighboring cells provided by the current platform) and/or one or more inter-platform neighboring cells (e.g., one or more neighboring cells provided by another platform).

In some aspects, the information associated with the set of neighboring cells may include information indicating one or more characteristics or parameters of one or more intra-platform neighboring cells, one or more neighboring platforms, one or more inter-platform neighboring cells associated with the one or more other platforms, cell specific information for the one or more neighboring cells, and/or another type of information. Additional details regarding the system information are provided below.

In some aspects, the terrestrial base station may determine the system information associated with the set of neighboring cells based at least in part on information stored or accessible by the terrestrial base station. For example, the terrestrial base station may store information associated with a group of cells of the NTN, and may determine the system information associated with the set of neighboring cells based at least in part on the stored information. As a particular example, the terrestrial base station may determine that the terrestrial base station is to transmit system information associated with a set of neighboring cells of the current cell and, based at least in part on the stored information, may identify the set of neighboring cells of the current cell and determine information associated with the set of neighboring cells.

As indicated by reference 310, the terrestrial base station may transmit the system information associated with the set of neighboring cells. In some aspects, the terrestrial base station may transmit (e.g., broadcast) the system information associated with the set of neighboring cells of the current cell. In some aspects, the terrestrial base station may transmit the information associated with the set of neighboring cells on a periodic basis, in response to detecting a trigger, based at least in part on a configuration of the terrestrial base station, and/or the like. In some aspects, the terrestrial base station may transmit the information associated with the set of neighboring cells based at least in part on receiving, from the UE, a request to provide information associated with a set of neighboring cells of the current cell.

As further indicated by reference 310, the UE may receive the information associated with the set of neighboring cells. In some aspects, the UE may attempt to receive the information associated with the set of neighboring cells on a periodic basis, in response to detecting a trigger, based at least in part on a configuration of the UE, and/or the like, and may receive the information associated with the set of neighboring cells, accordingly. In some aspects, the UE may attempt to receive the information associated with the set of neighboring cells based at least in part on transmitting, to the terrestrial base station (via the current cell), a request to provide information associated with a set of neighboring cells of the current cell, and may receive the information associated with the set of neighboring cells, accordingly.

As shown by reference 315, the UE may monitor a neighboring cell (e.g., measure the signal quality, track the position or track the frequency of the neighboring cell), of the set of neighboring cells, based at least in part on the system information. For example, the UE may, based at least in part on the information associated with the set of neighboring cells, select a target cell from the set of neighboring cells and initiate a handover from the current cell to the target neighboring cell. Here, if the handover is successful, the UE may communicate (e.g., transmit an uplink communication, receive a downlink communication) in the target cell (now the current cell).

In a typical NR system, neighboring cells can be categorized into intra-frequency neighboring cells and inter-frequency neighboring cells. However, due to the architecture of an NTN system, it may be comparatively simpler to categorize neighboring cells into intra-platform (e.g., intra-satellite) neighboring cells and inter-platform (e.g., inter-satellite) neighboring cells. Thus, for cells provided by the same platform, platform specific information (e.g., positioning information, attitude information, and/or the like) may need to be commonly broadcast to all the cells. In comparison, cell specific information (e.g., footprint information for one or more beams of a given cell) may need to be transmitted to a given UE for each cell.

Therefore, in some aspects, the system information may include a list of intra-platform neighboring cells associated with the platform (e.g., information that identifies one or more neighboring cells provided by the current platform). In some aspects, the system information may further include a blacklist of intra-platform neighboring cells associated with the platform (e.g., information that identifies one or more neighboring cells, provided by the current platform, that are reserved by the network and/or are not available or applicable for measurements, handovers, cell reselections, and/or the like).

Further, in some aspects, the system information may include a list of neighboring platforms (e.g., information that identifies one or more other platforms associated with providing one or more of the set of neighboring cells). Here, the system information may include a list of neighboring cells associated with a given neighboring platform on the list of neighboring platforms (e.g., information that identifies one or more neighboring cells provided by the given neighboring platform). In some aspects, the system information may further include a blacklist of neighboring cells associated with a given neighboring platform on the list of neighboring platforms (e.g., information that identifies one or more neighboring cells, provided by the given neighboring platform, that are reserved by the network and/or are not available or applicable for measurements, handovers, cell reselections, and/or the like).

In a case in which the neighboring cells are categorized into intra-platform neighboring cells and inter-platform neighboring cells, the system information may, in some aspects, be conveyed using a SIB including system information for intra-platform neighboring cells and a SIB including system information for inter-platform neighboring cells. FIG. 3B is a diagram illustrating SIB structures for conveying the system information in such a manner. In FIG. 3B, the system information 350 is conveyed using a SIB 355 and a SIB 360. As noted in FIG. 3B, SIB 355 includes system information for intra-platform neighboring cells and SIB 360 includes system information for inter-platform neighboring cells. Notably, in the example shown in FIG. 3B, platform specific information for inter-platform neighboring cells (e.g., platform specific information 365a for platform A and platform specific information 365b for platform B) is included in SIB 360, while platform specific information for intra-platform neighboring cells needs not to be transmitted in system information 350 (e.g., since such information would have already been conveyed in system information for the current cell).

Notably, while conveying the system information associated with the set of neighboring cells based on categorization intra-platform neighboring cells and inter-platform neighboring cells in the manner described above is relatively simple, such an implementation may require a significant change to an existing NR SIB structure. Thus, in some aspects, it may be desirable to utilize an existing NR neighboring cell SIB structure (e.g., categorization into intra-frequency neighboring cells and inter-frequency neighboring cells) to convey the system information (e.g., so as to minimize the change to the NR SIB structure). Therefore, in some aspects (e.g., when the existing NR neighboring cell SIB structure is used), the system information may include a platform identifier in an information element for a given neighboring cell in the set of neighboring cells. That is, within the NR neighboring cell SIB structure, the system information may include a platform identifier in an information element for each neighboring cell. Here, based at least in part on the platform identifier, cells provided by a given platform can be associated.

In some aspects, regardless of whether the system information is conveyed based at least in part on intra-platform/inter-platform categorization or utilizes the existing NR neighboring cell SIB structure, the system information may include one or more other types of information.

For example, in some aspects, the system information may include platform specific information for a neighboring platform associated with one or more neighboring cells in the set of neighboring cells. The platform specific information may include, for example, orientation information associated with the neighboring platform (e.g., a satellite attitude), positioning information associated with the neighboring platform (e.g., information that can be used to derive a location and/or a speed of the platform at a given time, and/or an indication of an accuracy of the information), and/or another type of information associated with the neighboring platform.

As another example, in some aspects, the system information may include cell specific information for each neighboring cell in the set of neighboring cells. In some aspects, the cell specific information for a given neighboring cell, of the set of neighboring cells, may include, for example, beam footprint information associated with a beam of the given neighboring cell (e.g., a beam orientation, a beam center location, a beam size, a beam shape, and/or the like), information that identifies a transmit power associated with the platform associated with the given neighboring cell, a cell identifier associated with the given neighboring cell, and/or another type of information associated with the neighboring cell.

In some aspects, to conserve resources and reduce overhead, it is desirable to broadcast platform specific system information, associated with a given platform, only once for all neighboring cells provided by the given platform. Therefore, in a case in which the existing NR neighboring cell SIB structure is used for conveying the system information in the manner described above, the system information may include platform specific information, associated with a given neighboring platform, in a single information element associated with one of the set of neighboring cells provided by the given platform. In some aspects, a given information element for a given neighboring cell may carry an indication of whether platform specific information for a platform that provides the given neighboring cell is included in the information element. For example, a particular neighboring platform may provide a first neighboring cell and a second neighboring cell. Here, an information element associated with the first neighboring cell may include platform specific information for the particular platform, and may also include an indication that the information element associated with the first neighboring cell carries the platform specific information for the particular platform. Conversely, an information element associated with the second neighboring cell may not include platform specific information for the particular platform (since the information element associated with the first neighboring cell carries the platform specific information for the particular platform), and may also include an indication that the information element associated with the second neighboring cell does not carry the platform specific information for the particular platform. Notably, such an indicator may not be transmitted for intra-platform neighboring cells, in some aspects (e.g., since platform specific information for the current platform should have been already provided).

In some aspects, the system information may include platform specific system information for one or more neighboring platforms, and cell specific system information for one or more intra-platform neighboring cells and/or one or more inter-platform neighboring cells, as described above. In some aspects, such information may be conveyed as full (e.g., stand-alone) information in the system information. Alternatively, in some aspects, the system information may include the full platform specific information for one or more reference platforms, and differential information for one or more other platforms. Similarly, in some aspects, the system information may include full cell specific information for one or more reference cells, and differential cell specific information for one or more other cells. For example, for a given platform, a differential platform orientation may be defined as actual platform orientation for the given platform minus an actual beam orientation of a reference platform. Here, the system information may include full platform specific information for the reference platform, and differential platform specific information for the given platform (and one or more other platforms). In some aspects, utilization of differential information reduces an amount of information (e.g., a number of bits) needed to transmit the system information.

Thus, in some aspects, the system information may include differential information for one or more neighboring platforms associated with one or more neighboring cells of the set of neighboring cells, where full information associated with a reference platform is a reference for the differential information. In some aspects, the full information associated with the reference platform may be platform specific information associated with the current platform (i.e., the current platform may be used as the reference platform).

As an example, full positioning information for platform positioning can be transmitted for the current platform, while differential positioning information can be provided for neighboring platforms. Here, the UE may use the full position information and differential positioning information for a given neighboring platform to reconstruct full information for the given neighboring platform.

Similarly, in some aspects, the system information may include differential information for one or more neighboring cells of the set of neighboring cells, where full information associated with a reference cell is a reference for the differential information. In some aspects, the full information associated with the reference cell may be cell specific information associated with the reference cell. Here, the reference cell may be the current cell, a first cell of a particular platform (e.g., the current platform or another platform), or a center cell of the particular platform (e.g., the current platform or another platform).

As an example, full beam footprint information for a particular cell (e.g., current cell, first cell, or center cell) of a platform can be transmitted, while differential beam footprint information can be transmitted for other cells associated with the platform. Here, the UE may use the full beam footprint information and differential beam footprint information, associated with a given other cell, to reconstruct full beam footprint information for the given other cell.

As indicated above, FIGS. 3A and 3B are provided as examples. Other examples may differ from what is described with respect to FIGS. 3A and 3B.

Figure 4:
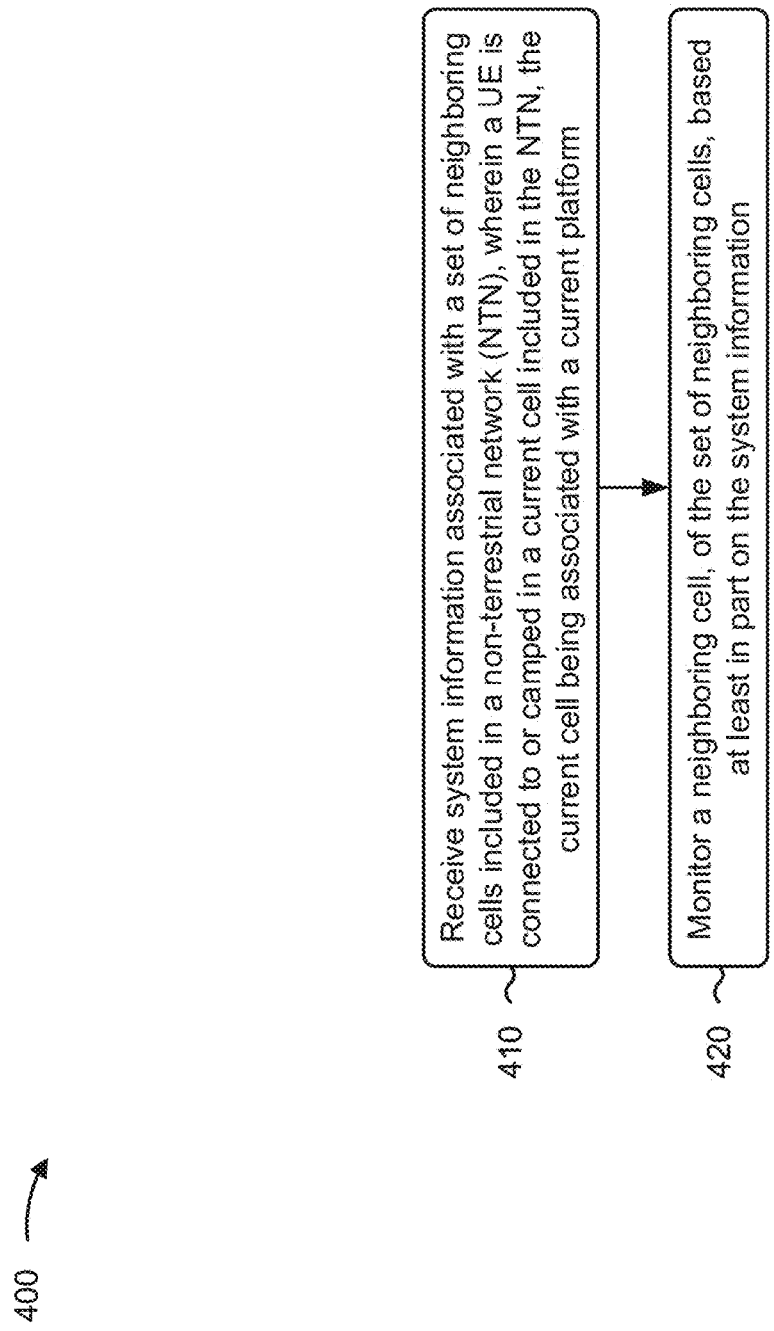
FIG. 4 is a diagram illustrating an example process performed, for example, by a user equipment, in accordance with various aspects of the present disclosure.

FIG. 4 is a diagram illustrating an example process 400 performed, for example, by a UE, in accordance with various aspects of the present disclosure. Example process 400 is an example where the UE (e.g., UE 120 and/or the like) performs operations associated with communication of system information for neighboring cells in an NTN, in accordance with various aspects of the present disclosure.

As shown in FIG. 4, in some aspects, process 400 may include receiving system information associated with a set of neighboring cells included in an NTN (block 410). For example, the UE (e.g., using receive processor 258, controller/processor 280, memory 282, and/or the like) may receive system information associated with a set of neighboring cells included in an NTN, as described above. In some aspects, the UE is connected to or camped in a current cell included in the NTN. In some aspects, the current cell is associated with a current platform.

As further shown in FIG. 4, in some aspects, process 400 may include monitoring a neighboring cell, of the set of neighboring cells, based at least in part on the system information (block 420). For example, the UE (e.g., using receive processor 258, transmit processor 264, controller/processor 280, memory 282, and/or the like) may monitor a neighboring cell, of the set of neighboring cells, based at least in part on the system information, as described above.

Process 400 may include additional aspects, such as any single aspect or any combination of aspects described below and/or in connection with one or more other processes described elsewhere herein.

In a first aspect, the system information includes a list of intra-platform neighboring cells associated with the current platform.

In a second aspect, alone or in combination with the first aspect, the system information includes a blacklist of intra-platform neighboring cells associated with the current platform.

In a third aspect, alone or in combination with one or more of the first and second aspects, the system information includes a list of neighboring platforms.

In a fourth aspect, alone or in combination with one or more of the first through third aspects, the system information includes a list of neighboring cells associated with a given neighboring platform on the list of neighboring platforms.

In a fifth aspect, alone or in combination with one or more of the first through fourth aspects, the system information includes a blacklist of neighboring cells associated with a given neighboring platform on the list of neighboring platforms.

In a sixth aspect, alone or in combination with one or more of the first through fifth aspects, the system information includes a system information block including system information for intra-platform neighboring cells and a system information block including system information for inter-platform neighboring cells.

In a seventh aspect, alone or in combination with one or more of the first through sixth aspects, the system information includes platform specific information for a neighboring platform, the neighboring platform being associated with one or more neighboring cells in the set of neighboring cells.

In an eighth aspect, alone or in combination with one or more of the first through seventh aspects, the platform specific information includes orientation information associated with the neighboring platform.

In a ninth aspect, alone or in combination with one or more of the first through eighth aspects, the platform specific information includes positioning information associated with the neighboring platform.

In a tenth aspect, alone or in combination with one or more of the first through ninth aspects, the system information includes cell specific information for each neighboring cell in the set of neighboring cells.

In an eleventh aspect, alone or in combination with one or more of the first through tenth aspects, the cell specific information for a given neighboring cell of the set of neighboring cells includes beam footprint information associated with a beam of the given neighboring cell.

In a twelfth aspect, alone or in combination with one or more of the first through eleventh aspects, the cell specific information for a given neighboring cell of the set of neighboring cells includes information that identifies a transmit power associated with the given neighboring cell.

In a thirteenth aspect, alone or in combination with one or more of the first through twelfth aspects, the cell specific information for a given neighboring cell of the set of neighboring cells includes a cell identifier associated with the given neighboring cell.

In a fourteenth aspect, alone or in combination with one or more of the first through thirteenth aspects, the system information includes a platform identifier in an information element for a given neighboring cell in the set of neighboring cells.

In a fifteenth aspect, alone or in combination with one or more of the first through fourteenth aspects, when the given neighboring cell is associated with a neighboring platform, the information element includes an indication of whether platform specific information, associated with the neighboring platform, is included in the information element associated with the given neighboring cell.

In a sixteenth aspect, alone or in combination with one or more of the first through fifteenth aspects, the information element includes the platform specific information, associated with the given neighboring cell, when the indication indicates that the platform specific information is included in the information element.

In a seventeenth aspect, alone or in combination with one or more of the first through sixteenth aspects, the platform specific information associated with the neighboring platform is included in only one information element of the system information for a single neighboring cell of the set of neighboring cells.

In an eighteenth aspect, alone or in combination with one or more of the first through seventeenth aspects, the system information does not include platform specific information associated with the current platform.

In a nineteenth aspect, alone or in combination with one or more of the first through eighteenth aspects, the system information includes differential information for one or more neighboring platforms associated with one or more neighboring cells of the set of neighboring cells, wherein full information associated with a reference platform is a reference for the differential information.

In a twentieth aspect, alone or in combination with one or more of the first through nineteenth aspects, the full information associated with the reference platform includes platform specific information associated with the current platform.

In a twenty-first aspect, alone or in combination with one or more of the first through twentieth aspects, the system information includes differential information for one or more neighboring cells of the set of neighboring cells, wherein full information associated with a reference cell is a reference for the differential information.

In a twenty-second aspect, alone or in combination with one or more of the first through twenty-first aspects, the full information associated with the reference cell includes cell specific information associated with the reference cell, the reference cell being the current cell of the current platform, a first cell of a particular platform, or a center cell of the particular platform.

Although FIG. 4 shows example blocks of process 400, in some aspects, process 400 may include additional blocks, fewer blocks, different blocks, or differently arranged blocks than those depicted in FIG. 4. Additionally, or alternatively, two or more of the blocks of process 400 may be performed in parallel.

Figure 5:
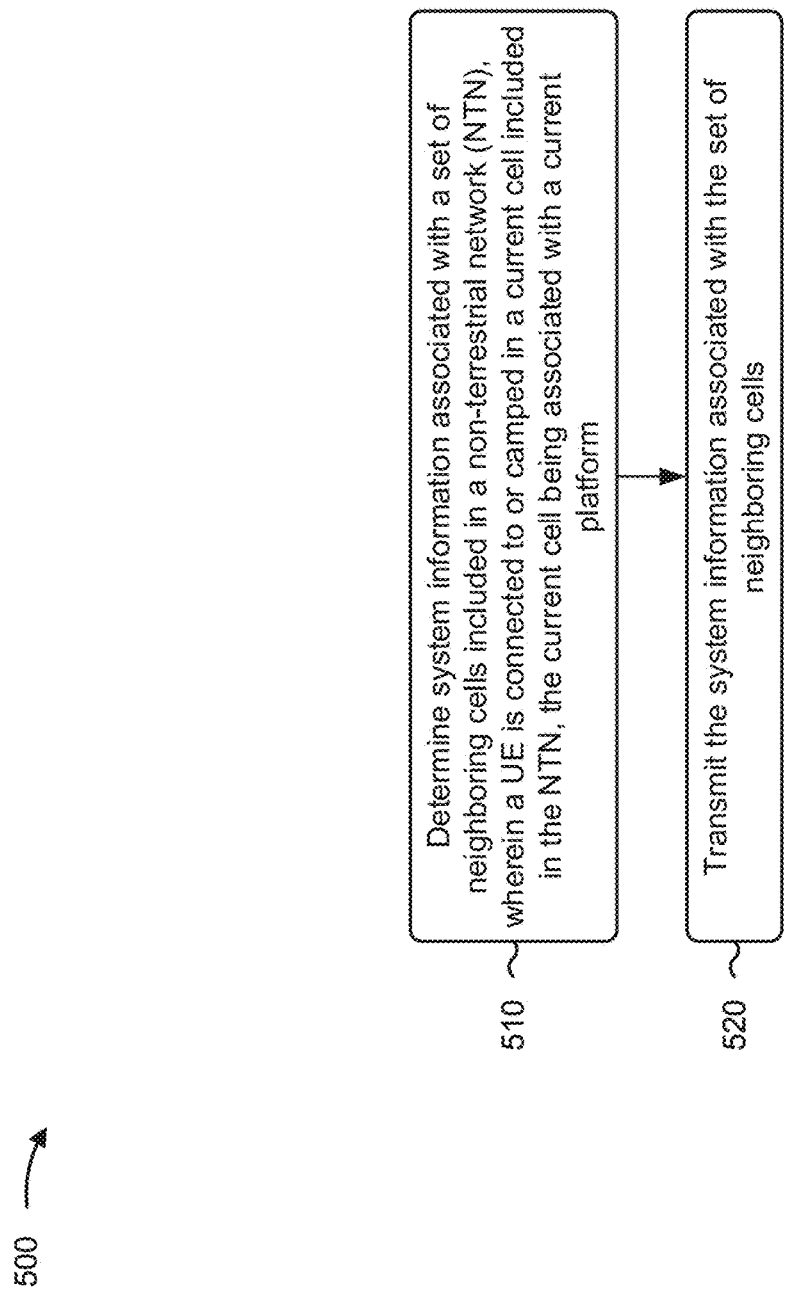
FIG. 5 is a diagram illustrating an example process performed, for example, by a base station, in accordance with various aspects of the present disclosure.

FIG. 5 is a diagram illustrating an example process 500 performed, for example, by a base station, in accordance with various aspects of the present disclosure. Example process 500 is an example where the base station (e.g., base station 110 and/or the like) performs operations associated with communication of system information for neighboring cells in an NTN, in accordance with various aspects of the present disclosure.

As shown in FIG. 5, in some aspects, process 500 may include determining system information associated with a set of neighboring cells included in an NTN (block 510). For example, the base station (e.g., using transmit processor 220, receive processor 238, controller/processor 240, memory 242, and/or the like) may determine system information associated with a set of neighboring cells included in an NTN, as described above. In some aspects, a UE (e.g., UE 120) is connected to or camped in a current cell included in the NTN. In some aspects, the current cell is associated with a current platform.

As further shown in FIG. 5, in some aspects, process 500 may include transmitting the system information associated with the set of neighboring cells (block 520). For example, the base station (e.g., using transmit processor 220, controller/processor 240, memory 242, and/or the like) may transmit the system information associated with the set of neighboring cells, as described above.

Process 500 may include additional aspects, such as any single aspect or any combination of aspects described below and/or in connection with one or more other processes described elsewhere herein.

In a first aspect, the system information includes a list of intra-platform neighboring cells associated with the current platform.

In a second aspect, alone or in combination with the first aspect, the system information includes a blacklist of intra-platform neighboring cells associated with the current platform.

In a third aspect, alone or in combination with one or more of the first and second aspects, the system information includes a list of neighboring platforms.

In a fourth aspect, alone or in combination with one or more of the first through third aspects, the system information includes a list of neighboring cells associated with a given neighboring platform on the list of neighboring platforms.

In a fifth aspect, alone or in combination with one or more of the first through fourth aspects, the system information includes a blacklist of neighboring cells associated with a given neighboring platform on the list of neighboring platforms.

In a sixth aspect, alone or in combination with one or more of the first through fifth aspects, the system information includes a system information block including system information for intra-platform neighboring cells and a system information block including system information for inter-platform neighboring cells.

In a seventh aspect, alone or in combination with one or more of the first through sixth aspects, the system information includes platform specific information for a neighboring platform, the neighboring platform being associated with one or more neighboring cells in the set of neighboring cells.

In an eighth aspect, alone or in combination with one or more of the first through seventh aspects, the platform specific information includes orientation information associated with the neighboring platform.

In a ninth aspect, alone or in combination with one or more of the first through eighth aspects, the platform specific information includes positioning information associated with the neighboring platform.

In a tenth aspect, alone or in combination with one or more of the first through ninth aspects, the system information includes cell specific information for each neighboring cell in the set of neighboring cells.

In an eleventh aspect, alone or in combination with one or more of the first through tenth aspects, the cell specific information for a given neighboring cell of the set of neighboring cells includes beam footprint information associated with a beam of the given neighboring cell.

In a twelfth aspect, alone or in combination with one or more of the first through eleventh aspects, the cell specific information for a given neighboring cell of the set of neighboring cells includes information that identifies a transmit power associated with the given neighboring cell.

In a thirteenth aspect, alone or in combination with one or more of the first through twelfth aspects, the cell specific information for a given neighboring cell of the set of neighboring cells includes a cell identifier associated with the given neighboring cell.

In a fourteenth aspect, alone or in combination with one or more of the first through thirteenth aspects, the system information includes a platform identifier in an information element for a given neighboring cell in the set of neighboring cells.

In a fifteenth aspect, alone or in combination with one or more of the first through fourteenth aspects, when the given neighboring cell is associated with a neighboring platform, the information element includes an indication of whether platform specific information, associated with the neighboring platform, is included in the information element associated with the given neighboring cell.

In a sixteenth aspect, alone or in combination with one or more of the first through fifteenth aspects, the information element includes the platform specific information, associated with the given neighboring cell, when the indication indicates that the platform specific information is included in the information element.

In a seventeenth aspect, alone or in combination with one or more of the first through sixteenth aspects, the platform specific information associated with the neighboring platform is included in only one information element of the system information for a single neighboring cell of the set of neighboring cells.

In an eighteenth aspect, alone or in combination with one or more of the first through seventeenth aspects, the system information does not include platform specific information associated with the current platform.

In a nineteenth aspect, alone or in combination with one or more of the first through eighteenth aspects, the system information includes differential information for one or more neighboring platforms associated with one or more neighboring cells of the set of neighboring cells, wherein full information associated with a reference platform is a reference for the differential information.

In a twentieth aspect, alone or in combination with one or more of the first through nineteenth aspects, the full information associated with the reference platform includes platform specific information associated with the current platform.

In a twenty-first aspect, alone or in combination with one or more of the first through twentieth aspects, the system information includes differential information for one or more neighboring cells of the set of neighboring cells, wherein full information associated with a reference cell is a reference for the differential information.

In a twenty-second aspect, alone or in combination with one or more of the first through twenty-first aspects, the full information associated with the reference cell includes cell specific information associated with the reference cell, the reference cell being the current cell of the current platform, a first cell of a particular platform, or a center cell of the particular platform.

Although FIG. 5 shows example blocks of process 500, in some aspects, process 500 may include additional blocks, fewer blocks, different blocks, or differently arranged blocks than those depicted in FIG. 5. Additionally, or alternatively, two or more of the blocks of process 500 may be performed in parallel.

The following provides an overview of some aspects of the present disclosure:

Aspect 1: A method of wireless communication performed by a user equipment (UE), comprising: receiving system information associated with a set of neighboring cells included in a non-terrestrial network (NTN), wherein the UE is connected to or camped in a current cell included in the NTN, the current cell being associated with a current platform; and monitoring a neighboring cell, of the set of neighboring cells, based at least in part on the system information.

Aspect 2: The method of aspect 1, wherein the system information includes a list of intra-platform neighboring cells associated with the current platform.

Aspect 3: The method of any of aspects 1-2, wherein the system information includes a blacklist of intra-platform neighboring cells associated with the current platform.

Aspect 4: The method of any of aspects 1-3, wherein the system information includes a list of neighboring platforms.

Aspect 5: The method of aspect 4, wherein the system information includes a list of neighboring cells associated with a given neighboring platform on the list of neighboring platforms.

Aspect 6: The method of any of aspects 4-5, wherein the system information includes a blacklist of neighboring cells associated with a given neighboring platform on the list of neighboring platforms.

Aspect 7: The method of any of aspects 1-6, wherein the system information includes a system information block including system information for intra-platform neighboring cells and a system information block including system information for inter-platform neighboring cells.

Aspect 8: The method of any of aspects 1-7, wherein the system information includes platform specific information for a neighboring platform, the neighboring platform being associated with one or more neighboring cells in the set of neighboring cells.

Aspect 9: The method of any of aspects 1-8, wherein the platform specific information includes orientation information associated with the neighboring platform.

Aspect 10: The method of aspect 8, wherein the platform specific information includes positioning information associated with the neighboring platform.

Aspect 11: The method of any of aspects 1-10, wherein the system information includes cell specific information for each neighboring cell in the set of neighboring cells.

Aspect 12: The method of aspect 11, wherein the cell specific information for a given neighboring cell of the set of neighboring cells includes beam footprint information associated with a beam of the given neighboring cell.

Aspect 13: The method of any of aspects 11-12, wherein the cell specific information for a given neighboring cell of the set of neighboring cells includes information that identifies a transmit power associated with the given neighboring cell.

Aspect 14: The method of any of aspects 11-13, wherein the cell specific information for a given neighboring cell of the set of neighboring cells includes a cell identifier associated with the given neighboring cell.

Aspect 15: The method of any of aspects 1-14, wherein the system information includes a platform identifier in an information element for a given neighboring cell in the set of neighboring cells.

Aspect 16: The method of aspect 15, wherein, when the given neighboring cell is associated with a neighboring platform, the information element includes an indication of whether platform specific information, associated with the neighboring platform, is included in the information element associated with the given neighboring cell.

Aspect 17: The method of aspect 16, wherein the information element includes the platform specific information, associated with the given neighboring cell, when the indication indicates that the platform specific information is included in the information element.

Aspect 18: The method of any of aspects 16-17, wherein the platform specific information associated with the neighboring platform is included in only one information element of the system information for a single neighboring cell.

Aspect 19: The method of any of aspects 1-18, wherein the system information does not include platform specific information associated with the current platform.

Aspect 20: The method of any of aspects 1-19, wherein the system information includes differential information for one or more neighboring platforms associated with one or more neighboring cells of the set of neighboring cells, wherein full information, associated with a reference platform, is a reference for the differential information.

Aspect 21: The method of aspect 20, wherein the full information associated with the reference platform includes platform specific information associated with the current platform.

Aspect 22: The method of any of aspects 1-21, wherein the system information includes differential information for one or more neighboring cells of the set of neighboring cells, wherein full information, associated with a reference cell, is a reference for the differential information.

Aspect 23: The method of aspect 22, wherein the full information associated with the reference cell includes cell specific information associated with the reference cell, the reference cell being: the current cell of the current platform, a first cell of a particular platform, or a center cell of the particular platform.

Aspect 24: A method of wireless communication performed by a base station, comprising: determining system information associated with a set of neighboring cells included in a non-terrestrial network (NTN), wherein a user equipment (UE) is connected to or camped in a current cell included in the NTN, the current cell being associated with a current platform; and transmitting the system information associated with the set of neighboring cells.

Aspect 25: The method of aspect 24, wherein the system information includes a list of intra-platform neighboring cells associated with the current platform.

Aspect 26: The method of any of aspects 24-25, wherein the system information includes a blacklist of intra-platform neighboring cells associated with the current platform.

Aspect 27: The method of any of aspects 24-26, wherein the system information includes a list of neighboring platforms.

Aspect 28: The method of aspect 27, wherein the system information includes a list of neighboring cells associated with a given neighboring platform on the list of neighboring platforms.

Aspect 29: The method of any of aspects 27-28, wherein the system information includes a blacklist of neighboring cells associated with a given neighboring platform on the list of neighboring platforms.

Aspect 30: The method of any of aspects 24-29, wherein the system information includes a system information block including system information for intra-platform neighboring cells and a system information block including system information for inter-platform neighboring cells.

Aspect 31: The method of any of aspects 24-30, wherein the system information includes platform specific information for a neighboring platform, the neighboring platform being associated with one or more neighboring cells in the set of neighboring cells.

Aspect 32: The method of aspect 31, wherein the platform specific information includes orientation information associated with the neighboring platform.

Aspect 33: The method of any of aspects 31-32, wherein the platform specific information includes positioning information associated with the neighboring platform.

Aspect 34: The method of any of aspects 24-33, wherein the system information includes cell specific information for each neighboring cell in the set of neighboring cells.

Aspect 35: The method of aspect 34, wherein the cell specific information for a given neighboring cell of the set of neighboring cells includes beam footprint information associated with a beam of the given neighboring cell.

Aspect 36: The method of any of aspects 34-35, wherein the cell specific information for a given neighboring cell of the set of neighboring cells includes information that identifies a transmit power associated with the given neighboring cell.

Aspect 37: The method of any of aspects 34-36, wherein the cell specific information for a given neighboring cell of the set of neighboring cells includes a cell identifier associated with the given neighboring cell.

Aspect 38: The method of any of aspects 24-37, wherein the system information includes a platform identifier in an information element for a given neighboring cell in the set of neighboring cells.

Aspect 39: The method of aspect 38, wherein, when the given neighboring cell is associated with a neighboring platform, the information element includes an indication of whether platform specific information, associated with the neighboring platform, is included in the information element associated with the given neighboring cell.

Aspect 40: The method of aspect 39, wherein the information element includes the platform specific information, associated with the given neighboring cell, when the indication indicates that the platform specific information is included in the information element.

Aspect 41: The method of any of aspects 39-40, wherein the platform specific information associated with the neighboring platform is included in only one information element of the system information for a single neighboring cell.

Aspect 42: The method of any of aspects 24-41, wherein the system information does not include platform specific information associated with the current platform.

Aspect 43: The method of any of aspects 24-42, wherein the system information includes differential information for one or more neighboring platforms associated with one or more neighboring cells of the set of neighboring cells, wherein full information, associated with a reference platform, is a reference for the differential information.

Aspect 44: The method of aspect 43, wherein the full information associated with the reference platform includes platform specific information associated with the current platform.

Aspect 45: The method of any of aspects 24-44, wherein the system information includes differential information for one or more neighboring cells of the set of neighboring cells, wherein full information, associated with a reference cell, is a reference for the differential information.

Aspect 46: The method of aspect 45, wherein the full information associated with the reference cell includes cell specific information associated with the reference cell, the reference cell being: the current cell of the current platform, a first cell of a particular platform, or a center cell of the particular platform.

Aspect 47: An apparatus for wireless communication at a device, comprising a processor; memory coupled with the processor; and instructions stored in the memory and executable by the processor to cause the apparatus to perform the method of one or more aspects of aspects 1-23.

Aspect 48: A device for wireless communication, comprising a memory and one or more processors coupled to the memory, the memory and the one or more processors configured to perform the method of one or more aspects of aspects 1-23.

Aspect 49: An apparatus for wireless communication, comprising at least one means for performing the method of one or more aspects of aspects 1-23.

Aspect 50: A non-transitory computer-readable medium storing code for wireless communication, the code comprising instructions executable by a processor to perform the method of one or more aspects of aspects 1-23.

Aspect 51: A non-transitory computer-readable medium storing a set of instructions for wireless communication, the set of instructions comprising one or more instructions that, when executed by one or more processors of a device, cause the device to perform the method of one or more aspects of aspects 1-23.

Aspect 52: An apparatus for wireless communication at a device, comprising a processor; memory coupled with the processor; and instructions stored in the memory and executable by the processor to cause the apparatus to perform the method of one or more aspects of aspects 23-46.

Aspect 53: A device for wireless communication, comprising a memory and one or more processors coupled to the memory, the memory and the one or more processors configured to perform the method of one or more aspects of aspects 23-46.

Aspect 54: An apparatus for wireless communication, comprising at least one means for performing the method of one or more aspects of aspects 23-46.

Aspect 55: A non-transitory computer-readable medium storing code for wireless communication, the code comprising instructions executable by a processor to perform the method of one or more aspects of aspects 23-46.

Aspect 56: A non-transitory computer-readable medium storing a set of instructions for wireless communication, the set of instructions comprising one or more instructions that, when executed by one or more processors of a device, cause the device to perform the method of one or more aspects of aspects 23-46.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software.

As used herein, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described herein may be implemented in different forms of hardware, firmware, and/or a combination of hardware and software.

The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a user equipment (UE), comprising:
   obtaining system information including beam footprint information associated with a beam of a neighboring platform included in a non-terrestrial network (NTN), wherein the UE is connected to or camped in a current cell included in the NTN, the current cell being associated with a current platform; and
   monitoring a neighboring cell, associated with the neighboring platform, based at least in part on the system information.

2. The method of claim 1, wherein the system information further includes a list of neighboring platforms including the neighboring platform.

3. The method of claim 2, wherein the system information further includes at least one of:
   a list of neighboring cells, including the neighboring cell, associated with the neighboring platform, or
   a blacklist of neighboring cells associated with the neighboring platform.

4. The method of claim 1, wherein the system information further includes a system information block including system information for an intra-platform neighboring cell and another system information block including system information for an inter-platform neighboring cell, and wherein the set of neighboring cells includes the intra-platform neighboring cell and the inter-platform neighboring cell.

5. The method of claim 1, wherein the neighboring cell is included in a set of neighboring cells included in the NTN.

6. The method of claim 5, wherein the system information further includes positioning information associated with the neighboring platform.

7. The method of claim 1, wherein the system information further includes cell specific information for each neighboring cell in the set of neighboring cells.

8. The method of claim 1, wherein the system information further includes a platform identifier for the neighboring cell.

9. The method of claim 1, wherein the system information further includes differential information for the neighboring platform.

10. The method of claim 1, wherein the system information further includes second differential information for the neighboring cell, and
    wherein full information, associated with a reference cell, is a reference for the second differential information.

11. The method of claim 1, wherein the system information further includes a cell identifier associated with the neighboring cell.

12. An apparatus for wireless communication, comprising:
    one or more memories comprising instructions; and
    one or more processors configured to execute the instructions and cause the apparatus to:
       obtain system information including beam footprint information associated with a beam of a neighboring platform included in a non-terrestrial network (NTN),
       wherein the apparatus is connected to or camped in a current cell included in the NTN, the current cell being associated with a current platform; and
       monitor a neighboring cell, associated with the neighboring platform, based at least in part on the system information.

13. The apparatus of claim 12, wherein the system information includes a list of neighboring platforms including the neighboring platform.

14. The apparatus of claim 12, wherein the system information includes a list of neighboring cells, including the neighboring cell, associated with the neighboring platform.

15. The apparatus of claim 12, wherein the neighboring cell is included in a set of neighboring cells included in the NTN.

16. The apparatus of claim 12, wherein the system information includes cell specific information associated with the neighboring cell.

17. The apparatus of claim 12, wherein the system information includes a cell identifier associated with the neighboring cell.

18. The apparatus of claim 12, wherein the system information includes differential information for the neighboring platform.

19. The apparatus of claim 12, wherein the system information further includes differential information for the neighboring cell, and
    wherein full information, associated with a reference cell, is a reference for the differential information.

20. A user equipment (UE), comprising:
    a receiver;
    a memory comprising instructions; and
    one or more processors configured to execute the instructions and cause the UE to:

obtain, via the receiver, system information including beam footprint information associated with a beam of a neighboring platform included in a non-terrestrial network (NTN),
  wherein the UE is connected to or camped in a current cell included in the NTN, the current cell being associated with a current platform; and
monitor a neighboring cell, associated with the neighboring platform, based at least in part on the system information.

* * * * *